United States Patent [19]

Ishkin et al.

[11] 4,342,923
[45] Aug. 3, 1982

[54] D.C. POWER TRANSMISSION LINE WITH LIGHTNING PROTECTION WIRES

[76] Inventors: Vyacheslav K. Ishkin, ulitsa Paustovskogo, 8, korpus 3, kv. 161; Veniamin G. Kagan, ulitsa Shukhova, 16, korpus 5, kv. 6, both of Moscow, U.S.S.R.

[21] Appl. No.: 297,697
[22] PCT Filed: Jan. 30, 1980
[86] PCT No.: PCT/SU80/00010
 § 371 Date: Aug. 31, 1981
 § 102(e) Date: Aug. 31, 1981
[87] PCT Pub. No.: WO81/02226
 PCT Pub. Date: Aug. 6, 1981

[30] Foreign Application Priority Data
 Jan. 12, 1978 [SU] U.S.S.R. ............... 2570670

[51] Int. Cl.³ .............. H02J 1/02; H02G 7/22; H02G 13/00
[52] U.S. Cl. .................. 307/147; 174/2; 174/40 R; 307/105; 307/146
[58] Field of Search ........ 174/2, 40 R, 45 R; 307/1, 42, 105, 146, 147; 340/310 R; 361/107, 117, 119, 132

[56] References Cited
FOREIGN PATENT DOCUMENTS
308687 6/1973 U.S.S.R. .
456371 2/1975 U.S.S.R. .

*Primary Examiner*—Laramie E. Askin

[57] ABSTRACT

A d.c. power transmission line comprises two wire-type systems providing for lightning protection of line conductors (2,3). One of the wire-type systems comprises at least two wires (9) in a spaced relation to each other and is located above a line conductor (2) connected to a negative pole (6) of a d.c. power supply (7). A second wire-type system comprises a single wire (11) and is located above a line conductor (3) connected to a positive pole (8) of the d.c. power supply (7).

1 Claim, 1 Drawing Figure

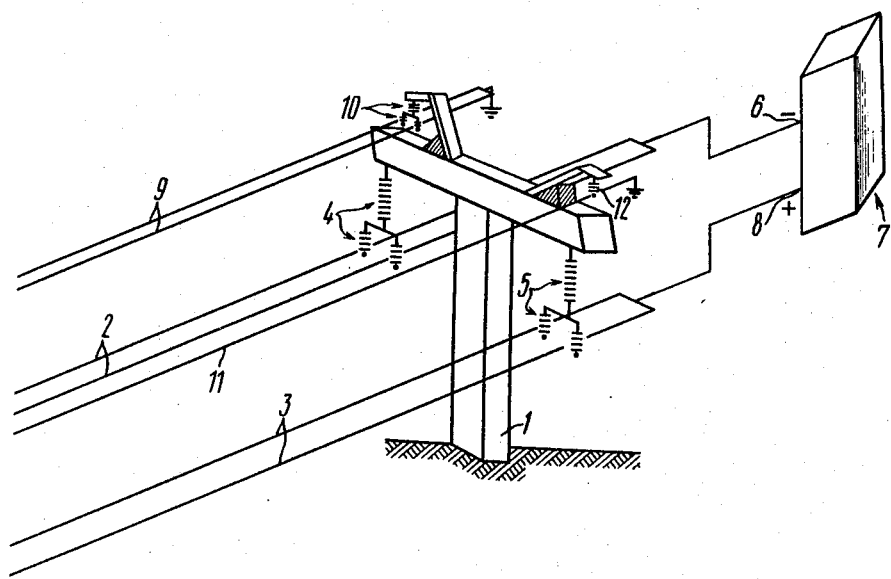

D.C. POWER TRANSMISSION LINE WITH LIGHTNING PROTECTION WIRES

TECHNICAL FIELD

The invention relates to means for transmitting electric energy, and more particularly to d.c. power transmission lines.

The invention is suitable for use in transmitting electric energy as well as information in the form of r.f. signals propagating over communication channels.

PRIOR ART

Known in the art are d.c. power transmission lines whose conductors are connected to a resonant circuit which is tuned in a manner that the fundamental harmonics caused by corona current are eliminated, with the result that corona effects are reduced (cf., for example, USSR Inventor's Certificate No. 285,083 published in the Bulletin of Discoveries, Inventions, Industrial Designs, Trade Marks, No. 33, 1971). The use of this resonant circuit, results, however, in loss of power transmitted through the line.

There is also a d.c. power transmission line incorporating two wire-type systems located above the line conductors which are connected to corresponding poles of a d.c. power supply.

These wire-type systems provide for lightning protection and include each two wires in a spaced relation to one another. One of the systems is located above that line conductor which is connected to the positive pole of the d.c. power supply, and the other is located above the line conductor connected to the negative pole of the d.c. power supply (cf., for example, USSR Inventor's Certificate No. 456,371, published in the Bulletin of Discoveries, Inventions, Industrial Designs, Trade Marks, No. 1, Jan. 5, 1975).

In the described d.c. power transmission line, it is not feasible, however, to provide each of the wire-type systems above the line conductors with two wires. It is known that streamers occurring at the positive pole are greatly responsible for interference. As a result, the wire-type system located above the line conductor connected to the negative pole works in more bad conditions since a positive potential is applied to it. On the other hand, that wire-type system which is located above the line conductor connected to the positive pole, is held at a negative potential and does not increase power loss due to corona or radio interference level.

DISCLOSURE OF THE INVENTION

An object of the invention is to provide a d.c. power transmission line offering a decreased power loss due to corona, a reduced radio interference level, and a saving of the amount of materials required for the manufacture of wire-type systems.

There is provided a d.c. power transmission line including two wire-type systems located, respectively, above line conductors which are connected to corresponding poles of a d.c. power supply, one of the wire-type systems, comprising at least two wires in a spaced relation to each other, being located, according to the invention, above one of said line conductors which is connected to a negative pole of said d.c. power supply, and a second one of the wire-type systems, comprising a single wire, being located above the line conductor connected to a positive pole of the d.c. power supply.

According to the invention, a considerable saving of the materials used in the manufacture of the lightning protection system is attained. In addition, power loss due to corona is reduced and radio interference level also.

BRIEF DESCRIPTION OF DRAWINGS

The invention will now be described in more detail with reference to an accompanying drawing which illustrates a section of a d.c. power transmission line, according to the invention.

BEST MODE OF CARRYING OUT THE INVENTION

The d.c. power transmission line comprises, according to the invention, line conductors 2,3 arranged on supports 1. The accompanying drawing shows a small section of the transmission line and a single support 1 only. The line conductors 2,3 are fixed using insulator strings 4,5, respectively. The conductors 2 are connected to a negative pole 6 of a d.c. power supply 7, and the conductors 3 are connected to a positive pole 8 of that power supply.

The transmission line comprises two wire-type systems which provide for lightning protection of the line conductors 2, 3 and are used to transmit data in the form of r.f. signals. One of the wire-type systems comprises two wires 9 affixed to the support 1 by means of an insulator string 10. The wires 9 are in a spaced relation to each other and are located above the line conductors 2 connected to the negative pole 6 of the d.c. power supply 7. There may be variants utilizing more than two wires 9.

Another one of the wire-type systems comprises a single wire 11 affixed to the support 1 by means of an insulator string 12 above the line conductors 3, which are connected to the positive pole 8 of the d.c. power supply 7. The streamers occurring at a positive pole are greatly responsible for interference. In the described embodiment, the positive pole is represented by that wire-type system which is located above the line conductors 2 connected to the negative pole 6 of the d.c. power supply 7. Since this wire-type system has two wires 9 in a spaced relation to each other, corona effects are eliminated, power loss due to corona becomes smaller and radio interference lever is reduced.

A single wire 11 in the wire-type system located above the line conductors 3 connected to the positive pole 8 is held at a negative potential and no corona is produced in this case.

Since one of the wire-type systems has a single wire only, a considerable material saving is attained.

INDUSTRIAL APPLICABILITY

This invention can be used for transmission of electric energy and, simultaneously, information as high frequency signals over communication channels.

We claim:

1. A d.c. power transmission line comprising line conductors connected, respectively, to poles of a d.c. power supply and two wire-type systems providing for lightning protection of the line conductors and located above the latter, characterized in that one of said wire-type systems is located above a first line conductor (2) connected to the negative pole (6) of said d.c. power supply (7) and comprises at least two conductors (9) arranged at a certain distance from each other, a second one of said wire-type systems having a single wire (11) being located above a second line conductor (3) connected to the positive pole (8) of said d.c. power supply (7).

* * * * *